(12) United States Patent
Yu

(10) Patent No.: US 6,575,376 B2
(45) Date of Patent: Jun. 10, 2003

(54) SYSTEM WITH IMPROVED METHODOLOGY FOR PROVIDING INTERNATIONAL ADDRESS VALIDATION

(75) Inventor: Chun Pong Yu, Singapore (SG)

(73) Assignee: Sybase, Inc., Dublin, CA (US)

( * ) Notice: Subject to any disclaimer, the term of this patent is extended or adjusted under 35 U.S.C. 154(b) by 265 days.

(21) Appl. No.: 09/788,063

(22) Filed: Feb. 16, 2001

(65) Prior Publication Data

US 2002/0153409 A1 Oct. 24, 2002

(51) Int. Cl.$^7$ .............................................. G06K 19/06
(52) U.S. Cl. ...................................... 235/494; 705/410
(58) Field of Search ........................... 235/494; 705/410

(56) References Cited

U.S. PATENT DOCUMENTS

| | | |
|---|---|---|
| 5,612,889 A | 3/1997 | Pintsov et al. |
| 5,930,796 A | 7/1999 | Pierce et al. |
| 5,936,865 A | 8/1999 | Pintsov et al. |
| 6,055,520 A | 4/2000 | Heiden et al. |
| 6,151,631 A * | 11/2000 | Ansell et al. ............... 235/494 |
| 6,175,827 B1 | 1/2001 | Cordery et al. |

* cited by examiner

*Primary Examiner*—Harold I. Pitts
(74) *Attorney, Agent, or Firm*—John A. Smart

(57) ABSTRACT

An international postal address validation system is described. The system defines a grammar for the encoding of all required address fields (within an address) for a given country, so that the system can determine whether all address fields required for a country are present for a given international postal address. More particularly, the system stores information about: (1) Required address fields (i.e., metadata describing address fields and data that must be present in all addresses for a country), for error checking; (2) Address languages, for normalization; and (3) Address data, for validation. By providing a grammar that encodes information about the required address fields for a given country, and that takes into account the variety of different languages and character encodings that an address may appear in, the system provides international postal address validation even though certain addresses require application of country-specific requirements.

25 Claims, 7 Drawing Sheets

SYSTEM WITH IMPROVED METHODOLOGY FOR PROVIDING INTERNATIONAL ADDRESS VALIDATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates in general to the field of data processing and, more particularly, to the processing and validation of postal address information.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system, or DBMS, is typically provided as a software cushion or layer. In essence, the DBMS shields the database user from knowing, or even caring, about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems,* Volume I and II, Addison Wesley, 1990; the disclosure of which is hereby incorporated by reference.

One particular need in the area of database processing is used for address validation. This is the process of ensuring or verifying that a particular postal address (e.g., provided to a database system) actually exists—that is, is valid. In general, the notion of validating postal addresses is not new. For example, a U.S.-specific system (e.g., U.S. Postal Service database) provides a validation database system for checking U.S. postal addresses. However, that system is focused on one country, the United States.

Such a U.S.-specific (or other country-specific) validation system is of no use for validating postal addresses for other countries. This stems in part from the fact that the U.S. system does not maintain a database of foreign addresses. For example, the U.S. system does not store appropriate information for validating Canadian postal addresses. However, there are other inherent limitations. For instance, a postal address may employ a different character set than would be valid for U.S. addresses. For a Chinese address, for example, a Chinese character set may be employed; for a Japanese address, a Japanese character set may be employed; for a Korean address, a Korean character set may be employed; and so forth and so on.

Other problems exist with a country-specific system. For example, although one ordinarily expects to find addresses mailed in a particular address format (e.g., name, followed by building number, street name, building sub-unit, followed by city, state, and zip code) for a U.S.-based system, postal addresses for other countries do not necessarily adopt the U.S. format for arranging address information. For example, the sequence of fields in a Russian street address is the reverse of a U.S. address sequence since it begins with the postal code, city, then street name, building number, and building sub-unit. However, other countries have even more peculiar formats. In Asia, such as in Japan, there is no global address structure based on street number and street name. Apart from its handling of data, the system itself is not localized and, thus, it is not capable of providing meaningful error messages for a given locale (e.g., what address information is missing for a particular country-specific postal address).

Another problem with existing validation systems is that they are not fully automated to the extent that users expect. Such systems do not provide any information as to why an address is invalid, such as which required fields are missing, or which fields contain invalid data (e.g., non-existent cities) or inconsistent data (e.g., using a postal code for Boston, Mass. for San Francisco, Calif.). Additionally, these systems may return a list of actual addresses that are "closed" in some way to the input address and leave it to users to determine the correct form. If a user misspells a city name or enters an unrecognized abbreviation, such a system would return a list of addresses with different cities or abbreviations for users to select. This is prone to fraud since, for example, a user could select a real address for billing that is not his or her own, thereby leading to disputes between creditors and occupants when payments are due. Automatic correction, or facilities to simplify manual correction, are useful but must not lead to fraud.

A particular problem is that a number of existing systems provide no free-form searching of the database for a particular part of an address. Instead, a user must first create an address to test. On occasion, however, a user might have the need to search or browse through a database looking for valid addresses without having to create a specific "test" address first. Consider, for instance, a situation where the user has misspelled a city name. In such a case, an existing system may simply flag the city name as ambiguous and, unfortunately, not offer any further help that would allow the user to resolve the correct spelling of the city name. In particular, that system does not provide any browsing capability that would allow the user to select the correct city name. In another example, suppose a user enters an abbreviation that the system does not recognize. In an existing system, the abbreviation may simply be flagged as ambiguous with little or no effort made to facilitate automatic correction of the abbreviation. What the user would prefer instead is a system that provides automatic correction, or at least automated facilities, that would greatly simplify the user's task of correcting invalid address information.

As yet another problem with the existing prior art validation systems is the inefficiency encountered in performing actual address comparisons. When dealing with large numbers of data records (e.g., in the billions), field-by-field comparison operations can be computationally expensive, thereby robbing a system of its performance. Although using standard database comparison operations for looking up address information may yield acceptable performance for validating U.S.-only addresses, that approach becomes painfully slow when validating worldwide address information for 190-plus countries (typically, several gigabytes of database data).

What is needed is a system that supports not only validation of addresses for a given country's postal addresses (e.g., U.S. addresses), but also includes support for validating the postal addresses for other countries as well. Such a global validation system would not be tied to any particular character set, but would instead be flexible enough to handle any country's address formats. The system would be able to correctly discern address information irrespective of country-specific features and be able to compare that information with known addresses in its database in an efficient manner. Additionally, the system should be able to ensure that incoming addresses meet country-specific requirements (as to acceptable address format) of the many different countries. The present invention fulfills this and other needs.

SUMMARY OF THE INVENTION

The present invention provides a system providing a grammar for the encoding of all required address fields (within an address) for a given country, so that the system can determine whether all address fields required for a country are present for a given international postal address. The present invention adopts an approach that permits international validation, even though certain addresses require application of country-specific requirements. In particular, the system stores:

(1) Required address fields (i.e., metadata describing address fields and data that must be present in all addresses for a country), for error checking;

(2) Address languages, for normalization; and (3) Address data, for validation.

The system provides an encoding process that takes into account the variety of different languages and character encodings that an address may appear in, as well as the country-specific requirements for different address fields.

The system achieves this by employing a context-free grammar that allows address information to be expressed in a very compact format. Advantages of this approach include:

(1) Minimum storage space required;

(2) Efficient decoding and usage; and (3) Handling of variations between different countries and languages is facilitated.

Thus, all necessary address information may be packaged in a compact data format that is easily stored and processed.

During processing of address information (stream), a signature or fingerprint is generated for each postal address. The signature is a checksum, a hash value, a message digest, or the like, which is selected to have a very high probability of being unique (i.e., minimum collision), thereby allowing the system to uniquely identify each address stream (i.e., postal address) with a terse identifier. In a corresponding manner, addresses stored in the system's database are associated with respective signatures. By using a signature instead of comparing address field information, the system is able to quickly look up an address by quickly computing its signature and comparing that against the signatures for existing addresses in its database.

A method for assisting with validation of international postal address information includes the following steps. The method establishes an address languages encoding on a per country basis, for specifying which written languages may be employed for a given postal address. Additionally, the method establishes a required address fields encoding on a per country basis, for specifying address fields that are required to be present for a given postal address to be valid. Now, the method may proceed to process address input. Upon receiving input comprising a particular postal address to be validated, the method (a) determines which written language the particular postal address employs, based on the address languages encoding, and (b) determines whether the particular postal address includes all required address fields, based on the required address fields encoding and said determined written language.

DETAILED DESCRIPTION OF A PREFERRED EMBODIMENT

The following description will focus on the presently-preferred embodiment of the present invention, which is operative in a network environment executing SQL client/server database applications on a multiprocessor platform running under a multiprocessor operating system. The present invention, however, is not limited to any particular application or environment. Instead, those skilled in the art will find that the present invention may be advantageously applied to any application or environment where optimization of database performance is desirable, including non-SQL data processing systems and the like, and may be advantageously embodied on a variety of different platforms, including Macintosh, Linux, BeOS, Solaris, UNIX, NextStep, and the like. The description of the exemplary embodiments which follows is, therefore, for the purpose of illustration and not limitation.

Computer-Based Implementation

A. Basic System Hardware (e.g., for Desktop and Server Computers)

Figure 1A:
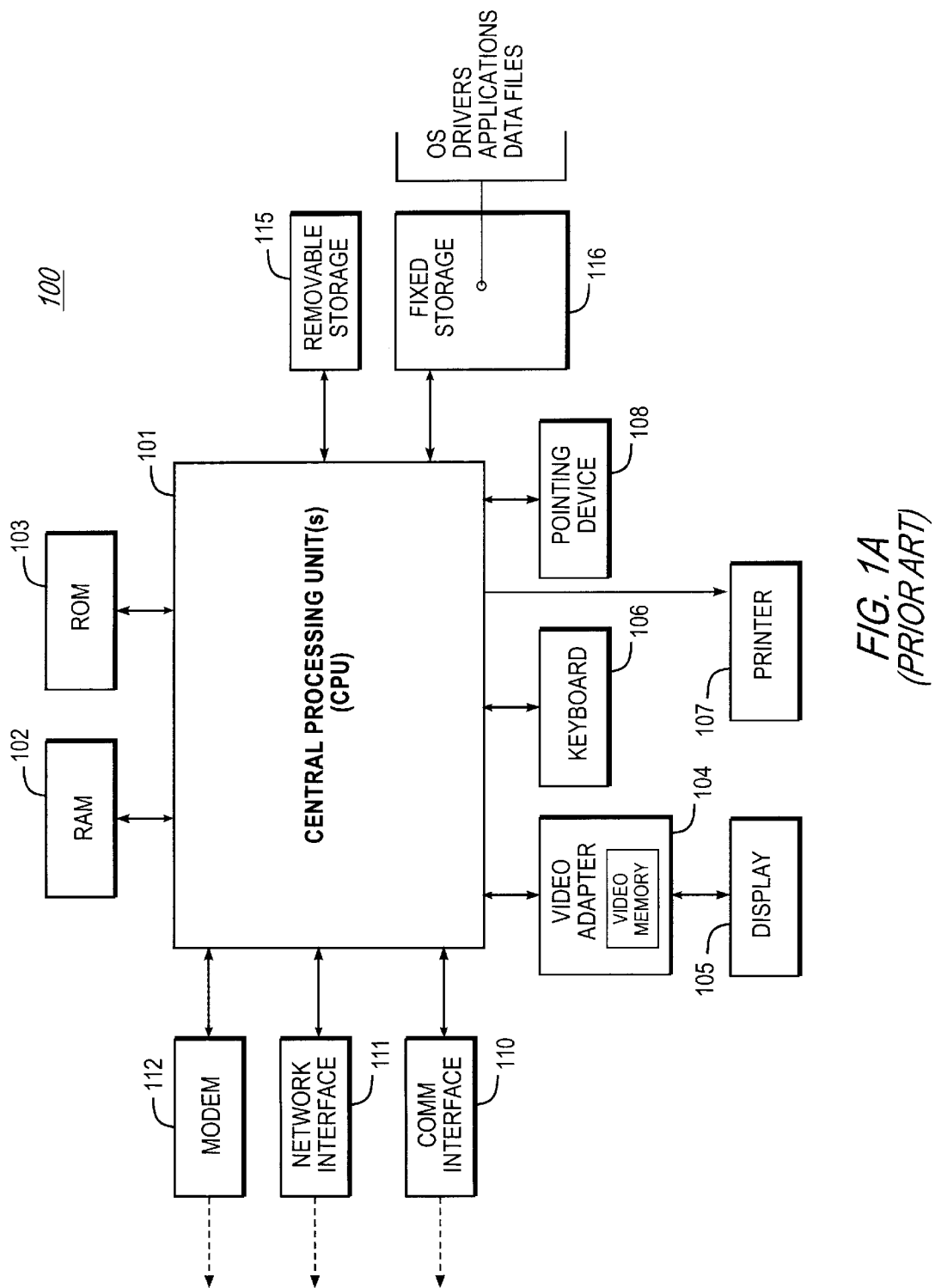
FIG. 1A is a block diagram illustrating a computer system in which the present invention may be embodied.

The present invention may be implemented on a conventional or general-purpose computer system, such as an IBM-compatible personal computer (PC) or server computer. FIG. 1A is a very general block diagram of an IBM-compatible system 100. As shown, system 100 comprises a central processor unit(s) (CPU) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary I/O controller circuitry and other "glue" logic). The bus, which includes address lines for addressing system memory, provides data transfer between, and among, the various components. Description of Pentium-class microprocessors and their instruction set, bus architecture, and control lines is available from Intel Corporation of Santa Clara, Calif. Random-access memory 102 serves as the working memory for the CPU 101. In a typical configuration for a client machine, RAM of 32 MB or more is employed; for a server machine, RAM on the order of several gigabytes is typical. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 1A, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the system.

The computer system displays text and/or graphic images and other data on the display device 105. Display device 105 is driven by the video adapter 104, which is interposed between the display device 105 and the system 100. The video adapter 104, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an BP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include an RS-232 serial port, a Universal Serial Bus (USB) interface, or the like. Devices that will be commonly-connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computers of Cupertino, Calif., and Sun Solaris workstations, which are available from Sun Microsystems of Mountain View, Calif.

The above-described system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 1B:
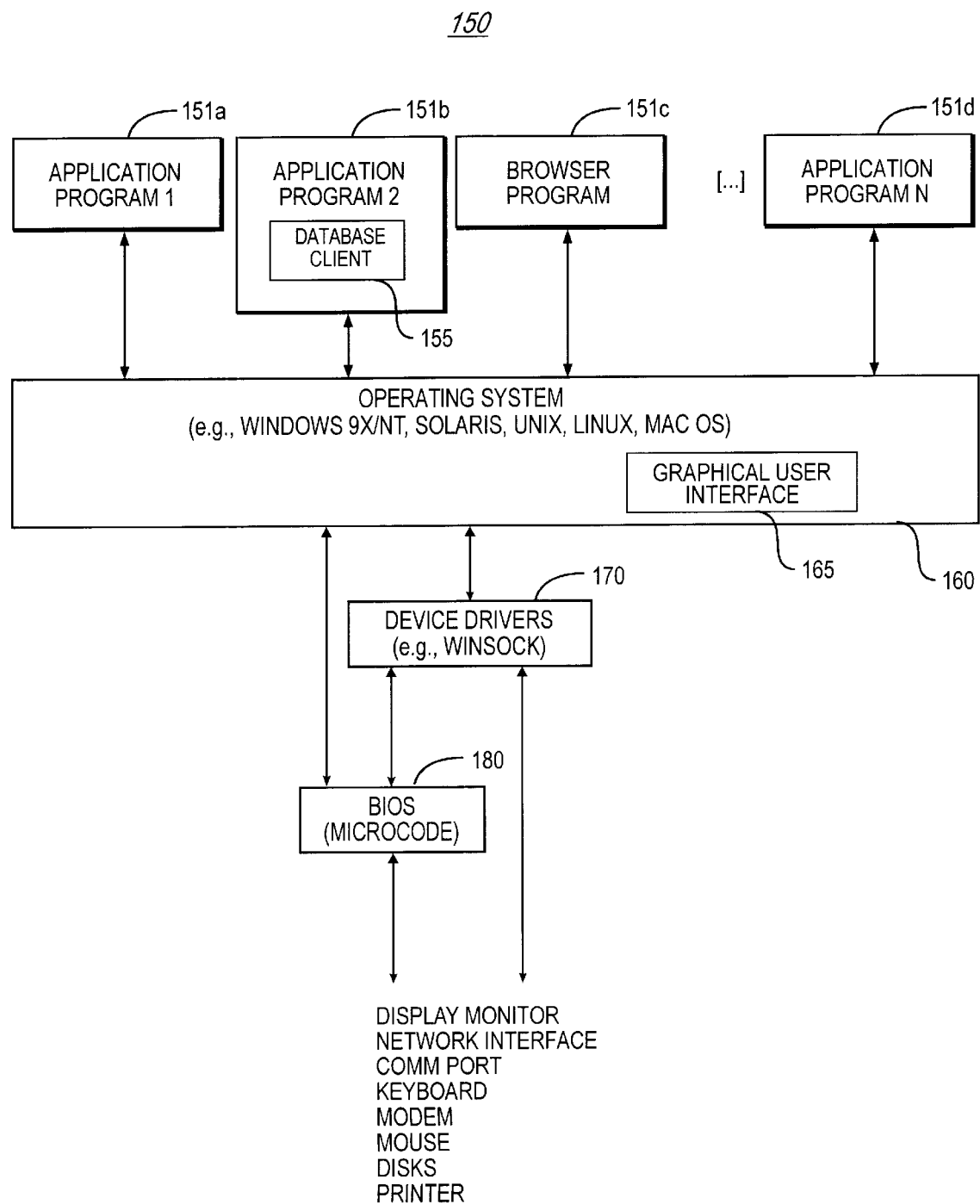
FIG. 1B is a block diagram illustrating a software subsystem for directing the operation of the computer system of FIG. 1A.

Illustrated in FIG. 1B, a computer software system 150 is provided for directing the operation of the computer system 100. Software system 150, which is stored in system (random-access) memory 102 and on fixed storage (e.g., hard disk) 116, includes a kernel or operating system (OS) 160. The OS 160 manages low-level aspects of computer operation, including managing execution of processes, memory allocation, file input and output (I/O), and device I/O. One or more application programs, such as client application software or "programs" 151 (e.g., 151*a*, 151*b*, 151*c*, 151*d*) may be "loaded" (i.e., transferred from fixed storage 116 into memory 102) for execution by the system 100.

Software system 150 includes a graphical user interface (GUI) 165, for receiving user commands and data in a graphical (e.g., "point-and-click") fashion. These inputs, in turn, may be acted upon by the system 100 in accordance with instructions from operating system 160 and/or client application module(s) 151. The GUI 165 also serves to display the results of operation from the OS 160 and application(s) 151, whereupon the user may supply additional inputs or terminate the session. Typically, the OS 160 operates in conjunction with device drivers 170 (e.g., "Winsock" driver) and the system BIOS microcode 180 (i.e., ROM-based microcode), particularly when interfacing with peripheral devices. For client machines, OS 160 can be provided by a conventional operating system, such as Microsoft® Windows 9x, Microsoft® Windows NT, or Microsoft® Windows 2000, all available from Microsoft Corporation of Redmond, Wash. Alternatively, OS 160 can also be an alternative operating system, such as IBM OS/2 (available from IBM of Armonk, N.Y.) or Macintosh OS (available from Apple Computers of Cupertino, Calif.). As described below, for the server machine, the operating system is preferably a server-based operating system supporting multiple processors.

As shown, the system 150 includes a Relational Database Management System (RDBMS) client or "front-end" 155, which itself may comprise any one of a number of database front-ends, including PowerBuilder™, dBASE®, Paradox®, Microsoft® Access, or the like. In an exemplary embodiment, the front-end will include SQL access drivers (e.g., ODBC (Open Database Connectivity) drivers, JDBC (Java Database Connectivity) drivers, native SQL (e.g., available from Sybase, Oracle, or the like) drivers, and so forth) for accessing SQL database server tables in a client/server environment.

Client/Server Database Management System

A. Basic Architecture

Figure 2:
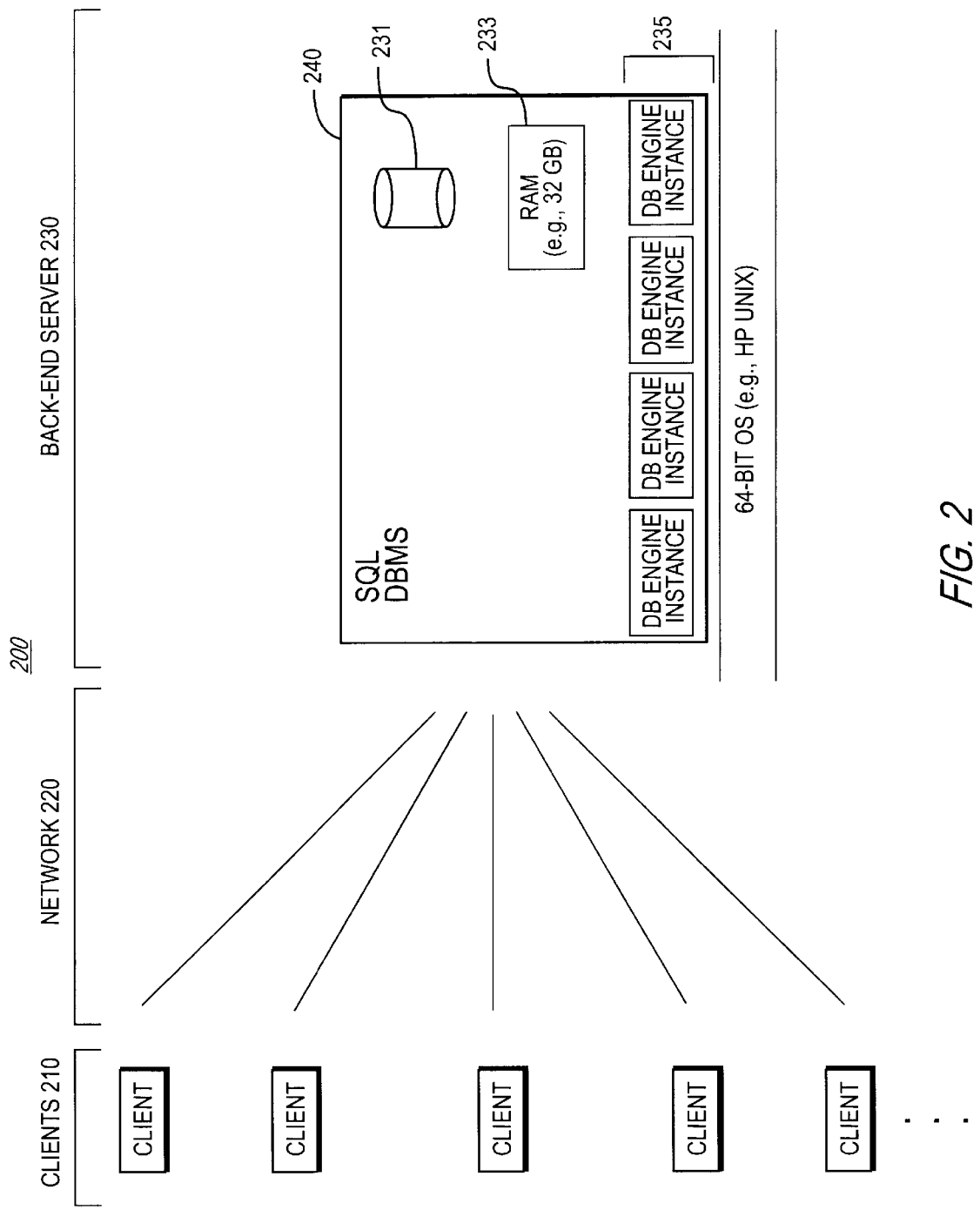
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 which is preferred for implementing the present invention. As shown, the system 200 comprises one or more Client(s) 210 connected via a Network 220 to a Back-end Server 230 having a SQL Database Server System 240. Specifically, the Client(s) 210 comprise one or more standalone devices connected to a Database Server System 240 using a conventional network. In an exemplary embodiment, the clients may themselves comprise a plurality of standalone workstations, dumb terminals, or the like, or comprise personal computers (PCs) such as the above-described system 100. Typically, such units would operate under a client operating system, such as Microsoft Windows 9x or 2000 for PC clients.

The Database Server System 240, which comprises Sybase Adaptive Server™ (Sybase, Inc. of Emeryville, Calif.) in an exemplary embodiment, generally operates as an independent process (i.e., independently of the clients) running under a server operating system such as Microsoft Windows NT (available from Microsoft Corporation of Redmond, Wash.), NetWare (available from Novell of Provo, Utah), or UNIX (Novell). In a preferred embodiment, the Database Server System 240 is deployed on a multi-processor computer, such as Hewlett-Packard's V-class UNIX-based machines (e.g., HP V2500 RISC-based computer) running on a 64-bit operating system (e.g., HP UNIX). In such a configuration, multiple engine instances 235 of the database server software run concurrently, one instance (e.g., UNIX process) per processor, all operating on a single shared memory 233 (e.g., 32 GB of main memory) with access to a persistent storage repository (e.g., disk) 231. The engines 235 are described in further detail below. The Network 220, on the other hand, may be any one of a number of conventional network systems, including a Local Area Network (LAN) or Wide Area Network (WAN), as is known in the art (e.g., using Ethernet, IBM Token Ring, or the like, communicating using a communication protocol, such as TCP/IP). The Network includes functionality for packaging client SQL calls and its parameters into a format (of one or more packets) suitable for transmission across a cable or wire, for delivery to the Database Server System 240.

Improved Methodology for Providing International Address Validation

A. Overview

The present invention provides a system having means for the encoding of all required address fields (within an address) for a given country, so that the system can determine whether all address fields required for a country are present for a given international postal address. The present invention adopts an approach that permits international validation, even though certain addresses require application of country-specific requirements. In particular, the system stores:

(1) Required address fields (i.e., metadata describing address fields and data that must be present in all addresses for a country), for error checking;

(2) Address languages, for normalization; and (3) Address data, for validation.

The system provides an encoding process that takes into account the variety of different languages and character encodings that an address may appear in, as well as the country-specific requirements for different address fields.

The system achieves this by employing a context-free grammar that allows address information to be expressed in a very compact format. Advantages of this approach include:

(1) Minimum storage space required;

(2) Efficient decoding and usage; and (3) Handling of variations between different countries and languages is facilitated.

Thus, all necessary address information may be packaged in a compact data format that is easily stored and processed.

During processing of address information (stream), a signature or fingerprint is generated for each postal address. The signature is a checksum, a hash value, a message digest, or the like, which is selected to have a very high probability of being unique (i.e., minimum collision), thereby allowing the system to uniquely identify each address stream (i.e., postal address) with a terse identifier. In a corresponding manner, addresses stored in the system's database are associated with respective signatures. By using a signature instead of comparing address field information, the system is able to quickly look up an address by quickly computing its signature and comparing that against the signatures for existing addresses in its database.

B. Grammar for Required Address Fields

1. Overview

Figure 3:
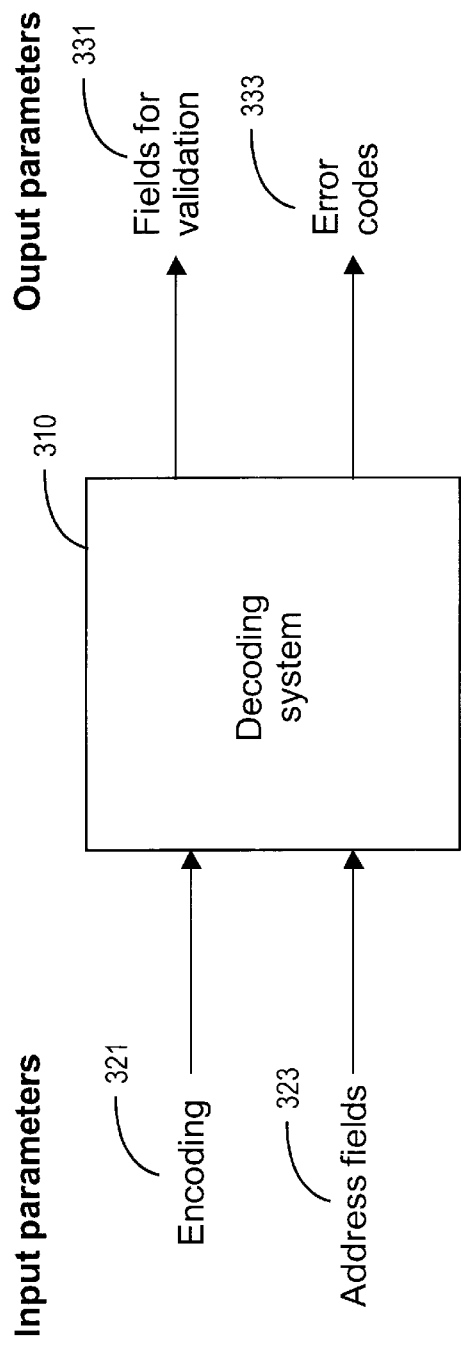
FIG. 3 is a high-level block diagram of a decoding address metadata system of the present invention.

In accordance with the present invention, a grammar is defined for encoding required address fields. The address metadata information is user-configurable for customizing required address field information on a country-by-country basis. Given the multitude of country-by-country variations in postal addresses, typically one would employ technicians to manually encode information about required address fields (i.e., address metadata) for countries of interest. This address metadata, in turn, is employed by a decoding address metadata system 300 of the present invention, as shown in FIG. 3. More particularly, the system 300 processes a given address to be validated in conjunction with the appropriate address metadata that describes required address fields for that address' country. The system 300 would typically be used as part of, or in conjunction with, a system requiring address validation (e.g., database system providing address validation support) where a user inputs an address for validation. As part of validating addresses, the system 300 ensures that all of the information required for that address—on a country-specific basis—is present. As shown, the system 300 includes a decoding system (proper)

310 having both input and output parameters. The input parameters include required-address-fields encoding input 321 and address fields input 323. The output parameters, on the other hand, include fields for validation output 331 and error codes output 333.

The required-address-field encoding input 321, which is provided in Unicode text string format, represents the encoding information that describes the required address fields. In conjunction with this, the user-entered address information is provided as the address fields input 323. Thus, at this point, the user-entered address information is already broken up into individual address fields. In response, the decoding system 310 deciphers the inputs and checks the address fields for validity, using a decoding method (described in detail below). All information regarding required fields and data available for validation (if any) are represented in the encoding. The system 310 produces an output of a list of the fields that are to be validated by the system and a list of error codes indicating missing fields (if any).

2. Encoding Grammar

The grammar used for encoding required address fields is a context-free grammar specified as follows:

| | | |
|---|---|---|
| 1. | character | any printable symbol encoded according to the Unicode Standard, Version 3 or later |
| 2. | string | (character)+ |
| 3. | fieldcode | any non-negative number represented as a character string |
| 4. | field | NOT fieldcode COLON \| fieldcode [[NOT] EQUALS literal] COLON |
| 5. | literal | BAR string BAR |
| 6. | condition | NOT fieldcode \| fieldcode [[NOT] EQUALS literal] |
| 7. | operand | LBRACKET boolexpr RBRACKET \| condition |
| 8. | andexpr | operand AND andexpr \| operand |
| 9. | boolexpr | andexpr OR boolexpr \| andexpr |
| 10. | qualifier | QUESTION boolexpr COLON |
| 11. | required | PERCENT boolexpr PERCENT |
| 12. | valfields | DOLLAR qualified DOLLAR |
| 13. | qualified | (qualifier(field) + SEMIC) + [(field) + SEMIC ] |
| 14. | reqfields | required \| qualified [valfields] \| required qualfied [valfields] |

DOLLAR, PERCENT, SEMIC, QUESTION, COLON, OR, AND, EQUALS, BAR, NOT, LBRACKET, and RBRACKET are distinct non-printable characters encoded according to the Unicode Standard, Version 3 or later. For a discussion of the Unicode Standard, see, e.g., The Unicode Consortium, The Unicode Standard, Version 3.0, Reading, Mass., Addison-Wesley Developers Press, copyright 2000, ISBN 0-201-61633-5, the disclosure of which is hereby incorporated by reference. Additional information is available on the Internet at http://www.unicode.org.

The meanings of the punctuation symbols used on the right hand side and the meaning of the encoding can be explained as follows:

Line 14 specifies that required address fields, reqfields, can be encoded in these ways:

1. Address fields that are always required are encoded in required.
2. If address fields are dependant upon conditions, these are encoded in qualified and valfields in which case qualified comes first followed by valfields, if any. The reason for having two separate encodings is flexibility in how they can be used. For example, qualified can be used to detect missing address fields that are required under certain conditions, while valfields can be used to specify data available in an address database for validating address fields depending on the type of address fields present. If valfields is used for this purpose, then all fields in valfields are simply fieldcode, i.e., (field)+ becomes a list of fields indicating data available for validation.
3. A combination of the above is also possible, in which case required comes first, then qualified, followed by valfields, if any.

Line 13 specifies that if address fields are dependant upon a condition, the condition is encoded first in qualifier, followed by the fields themselves. These fields, (field)+, are terminated by SEMIC as are an optional set of fields terminating the encoding which do not depend on any conditions. The intention is that if no conditions are met, then the last set of fields must be present in addresses, and if this last set of fields is absent and no conditions are met, then the address is invalid.

Line 12 specifies that valfields use the qualified encoding bracketed by DOLLAR symbols.

Line 11 specifies that fields in required are bracketed by PERCENT symbols and are written as a boolean expression, boolexpr. The intention here is that all required fields are present if boolexpr evaluates to TRUE.

Line 10 specifies that a qualifier begins with QUESTION and ends with COLON and is also expressed as a boolean expression, boolexpr.

Line 9 specifies that boolexpr is either a single andexpr or andexpr separated from boolexpr by OR. The intention here is that the boolean expression evaluates to TRUE if either andexpr or boolexpr is TRUE, or if boolexpr is a single andexpr, that andexpr is TRUE.

Line 8 specifies that andexpr is either a single operand or operand separated from andexpr by AND. The intention here is that andexpr evaluates to TRUE if both operand and andexpr are TRUE, or if andexpr is a single operand, that operand is TRUE.

Line 7 specifies that operand is either a boolexpr bounded by LBRACKET and RBRACKET, or a condition.

Line 6 specifies that a condition either states that an address field, fieldcode, must not be present (NOT fieldcode) or states that it must (not) have a certain value, literal.

Line 5 specifies that a literal value is a string enclosed in BARs.

Line 4 specifies that a field, that is part of a list of such fields, can contain three kinds of checks on an address field, fieldcode:

1. If NOT appears before fieldcode, then the address field must not be in the input address.
2. If only fieldcode is present, then the address field must be in the input address.
3. If [NOT] EQUALS literal follows fieldcode, then the address field can be checked for a particular string literal.

Line 3 specifies that an address field is any non-negative number represented as a character string (as opposed to its binary form).

Line 2 specifies that a string is any sequence of one or more character.

Line 1 specifies that a character is any printable symbol encoded according to the latest version of the Unicode Standard either at, or after, Version 3.

3. Encoding Examples

The following examples are given only for the purpose of illustrating the encoding above. They use the English alphabet to represent characters from any language encoded according to the Unicode Standard, and the values in Table 1 for grammar symbols and the values in Table 2 for address fields and fieldcodes:

TABLE 1

Grammar symbols and values

| Grammar Symbol | Value |
| --- | --- |
| PERCENT | % |
| SEMIC | ; |
| QUESTION | ? |
| COLON | : |
| OR | \|\| |
| AND | && |
| EQUALS | = |
| BAR | \| |
| NOT | ! |
| LBRACKET | ( |
| RBRACKET | ) |

TABLE 2

Address fields and fieldcodes

| Address Field | fieldcode |
| --- | --- |
| Province | 1 |
| County | 2 |
| City | 3 |
| District | 4 |
| House number | 5 |
| Street | 6 |
| Postbox | 7 |
| Postal code | 8 |
| Company name | 9 |
| Person name | 10 |

EXAMPLE 1

Encoding:

%(10||9)&&3&&7%

Meaning:

Addresses must either have a person or company name and must always have a city name and a postbox number.

EXAMPLE 2

Encoding:

%10&&7&&1&&(2||3||4)%

Meaning:

Addresses must have a person's name, postbox number, and a province, plus either a county, city, or district name.

EXAMPLE 3

Encoding:

%10&&3%?6:5:;7:;

Meaning:

Addresses must have a person's name and a city name. If a street name is present, there must always be a house number. Otherwise, if no street name is present, there must be a postbox number.

EXAMPLE 4

Encoding:

%3&&(9||10)%?1=|Some Name|&&6:2:5:;?1=|Another Name|&&(3=|Yet Another Name|||3=|Name|)&&2:7:8:;6:8:;

Meaning:

Addresses must have a person or company name plus a city name. If province has the value "Some Name" and there is a street name in the address, then there must also be a county and house number. If, however, province is "Another Name" and city is either "Yet Another Name" or "Name" and there is a county name, then there must be a postbox and postal code.

If none of these are true, then addresses must have a street and postal code.

EXAMPLE 5

Encoding:

%3&&(9||10)%?1=|Name|&&6:2:5:;?1=|Name2|&&(3=|Name3|||3=|Name |)&&2:7:8:;$?1:1:2:5:;$ This is similar to Example 4 except that it now contains a valfields that specifies that if province data is in an input address, then county and house number can be verified against the contents of an address database containing data for the country that the input address applies to.

4. Pseudocode to Process Encoded Data

The use of parsers to process strings encoded according to context-free grammars is well-known to those versed in the art. See, e.g., Alfred V. Aho, Ravi Sethi, Jeffrey D. Ullman, *Compilers: Principles, Techniques, and Tools,* Addison-Wesley Publishing Company, 1986, the disclosure of which is hereby incorporated by reference. The pseudocode for a parser that processes strings encoded using the context-free grammar is shown below. Parsers to process these encodings can be implemented in popular programming languages, such as C and Java.

5. Use of Required Fields Encodings in Validation

Almost all countries require certain fields to be present in all local addresses. A quick check to determine the presence of these fields is therefore a useful means of establishing that an address has met the minimum criteria for validity. Required fields encodings can be stored in a database according to the countries they apply to. The pseudocode below serves to illustrate a method of how required fields encodings can be used for validation:

```
given country a and address a
retrieve required fields encoding for c
using parser for encoding
    verify that all unqualified fields are present
    evaluate qualifiers in qualified if present
        if one of them is true, verify that its fields are
        present
        otherwise, verify that last set of unqualified fields are
        present
    evaluate qualifiers in valfields if present
        if one of them is true, return its fields
        otherwise, return fields in the last set of unqualified
        fields
```

As can be seen, after the encodings for the country are retrieved, they are parsed and:

1. If any fields represented by required (encoding Grammar) are present in the encoding, all of them must be present in a (line 4).
2. Evaluate the qualifier in each qualified present and if one of them is TRUE, verify that the fields encoded by (field)+SEMIC)+are present in a (line 6). Only the first qualifier that evaluates to TRUE is used.
3. If no qualifier is TRUE and there is an unqualified set of fields terminating the encoding, then verify that these fields are present in a (line 7).
4. Evaluate the qualifier in each valfields present and if one of them is TRUE, return the list of fields in (field)+SEMIC)+as fields that can be used in validation. Only the first qualifier that evaluates to TRUE is used.

5. If no qualifier is TRUE and there is an unqualified set of fields terminating the encoding, then these fields are returned instead.

6. Parser Implementation to Process (Decode) Required Fields Grammar

Decoding serves two purposes:

(1) To determine whether all required address fields under various circumstances are present. For example, in Singapore, addresses with postbox numbers must include the post office name and postal code. On the other hand, addresses with street names must include a house/building number and postal code. If any fields are missing, these are flagged with an error code; and (2) To determine the set of address fields that can be validated against the address database. The database need not have all the information present for a particular country's addresses. The grammar therefore indicates which are available so that validation routines know which fields to use for validation.

The inputted address information is decoded on-the-fly by comparing each inputted address field (from input 323) against the corresponding required-address-field encoding input 321. The parser code to process required field encodings and the above-described grammar can be implemented as programs operating outside the database, retrieving encodings as, and when they are, needed from the database. With the advent of databases supporting Java classes (and perhaps other languages in the future), parser and pseudocode implementations in Java (and other languages) can also be included in the same database as the language encodings.

The following pseudocode presents a parser implementation that processes a string (cfg) encoded according to the grammar above and indicates any problems with address in errors. If there are no problems, it obtains a list of fields for validation from valfields in cfg and puts them into valfields. The pseudocode does not show code for detecting errors in cfg itself.

```
Input
cfg: string containing an encoding created using grammar in FIG. 1
address: a data structure containing an address
Output
errors: a data structure to hold error codes
valfields: a list of fields that can be used for validation
Pseudocode
main:
while more data in cfg
    if current character is PERCENT then process required by:
        status ← evaluate_boolexpr (cfg, address, errors)
        if boolexpr is false then
            return address invalid
        otherwise continue processing cfg
    else if current character is QUESTION then process qualified by:
        /* evaluate boolexpr in qualifier: we don't pass errors to
         * evaluate_boolexpr () since we only need to see if qualifier
         * is true and not check for errors */
        status ← evaluate_boolexpr (cfg, address)
        if boolexpr is false then
            ignore all ( field )+ after qualifier by skipping to terminating SEMIC
        else check that all ( field )+ are correct by:
            status ← check_fields (cfg, address, errors)
            if status is OK then skip to valfields by:
                looking for DOLLAR character in cfg
                if no DOLLAR is found then no valfields so:
                    return all OK but no valfields
                else
                    get_valfields (cfg, valfields)
                    return all OK
                end if
            else
                return status
            end if
        end if
    else we are at terminating ( field )+ SEMIC sequence in qualified since all
            preceding qualifier expressions have been false
        status ← check_fields (cfg, address, errors)
        return status
    endif
end while
evaluate_boolexpr:
result ← evaluate_andexpr (cfg, address, errors)
check character after andexpr
if it is OR then
    if result is false then evaluate boolexpr following OR by:
        result ← evaluate_boolexpr (cfg, address, errors)
    else
        skip to the end of the boolexpr
        return true
    end if
else only andexpr in boolexpr, so finished evaluating boolexpr:
    return result
end if
```

-continued

```
evaluate_andexpr:
result ← evaluate_operand (cfg, address, errors)
check character after operand
if it is AND then
    if result is true then evaluate andexpr following AND by:
        result ← evaluate_andexpr (cfg, address, errors)
    else
        skip to the end of the andexpr
        return false
    end if
else only operand in andexpr, so finished evaluating andexpr:
    return result
end if
evaluate_operand:
check first character
if it is LBRACKET then evaluate boolexpr following LBRACKET by:
    result ← evaluate_boolexpr (cfg, address, errors)
    return result
else only condition in operand so:
    result ← evaluate_condition (cfg, address, errors)
    return result
end if
evaluate_condition:
check first character
if it is NOT then evaluate NOT fieldcode by:
    if address [fieldcode] is not NULL
        mark errors [fieldcode] as an illegal field
else evaluate fieldcode [[NOT] EQUALS literal] by:
    if NOT EQUALS is present then
        if address [fieldcode] = literal then
            mark errors [fieldcode] as invalid
        end if
    else if EQUALS is present then
        if address [fieldcode] is not literal then
            mark errors [fieldcode] as invalid
        end if
    else only fieldcode is present so:
        if address [fieldcode] = NULL then
            mark errors [fieldcode] as missing
        end if
    end if
end if
check_fields:
while still more field's present, i.e. while terminating SEMIC not reached
yet
    if field is NOT fieldcode COLON then
        if address [fieldcode] is not NULL then
            mark errors [fieldcode] as an illegal field
        end if
    else evaluate fieldcode [[NOT] EQUALS literal] by:
        if NOT EQUALS is present then
            if address [fieldcode] = literal then
                mark errors [fieldcode] as invalid
            end if
        else if EQUALS is present then
            if address [fieldcode] is not literal then
                mark errors [fieldcode] as invalid
            end if
        else only fieldcode is present so:
            if address [fieldcode] = NULL then
                mark errors [fieldcode] as missing
            end if
        end if
    end if
end while
get_valfields:
/* note that each field in valfields has the form fieldcode */
loop
    if current character is QUESTION then evaluate qualifier by
        /* evaluate boolexpr in qualifier: we don't pass errors to
         * evaluate_boolexpr () since we only need to see if qualifier
         * is true and not check for errors */
        status ← evaluate_boolexpr (cfg, address)
        if boolexpr is false then
            ignore all ( field )+ after qualifier by skipping to terminating SEMIC
        else
            assign fieldcode's excluding terminating SEMIC to valfields
            return
        end if
```

-continued

```
      else we are at terminating ( field )+ SEMIC sequence in qualified since all
          preceding qualifier expressions have been false
        assign fieldcode's excluding terminating SEMIC to valfields
        return
      endif
end loop
```

C. Encoding System for Address Languages

1. Overview

Figure 4:
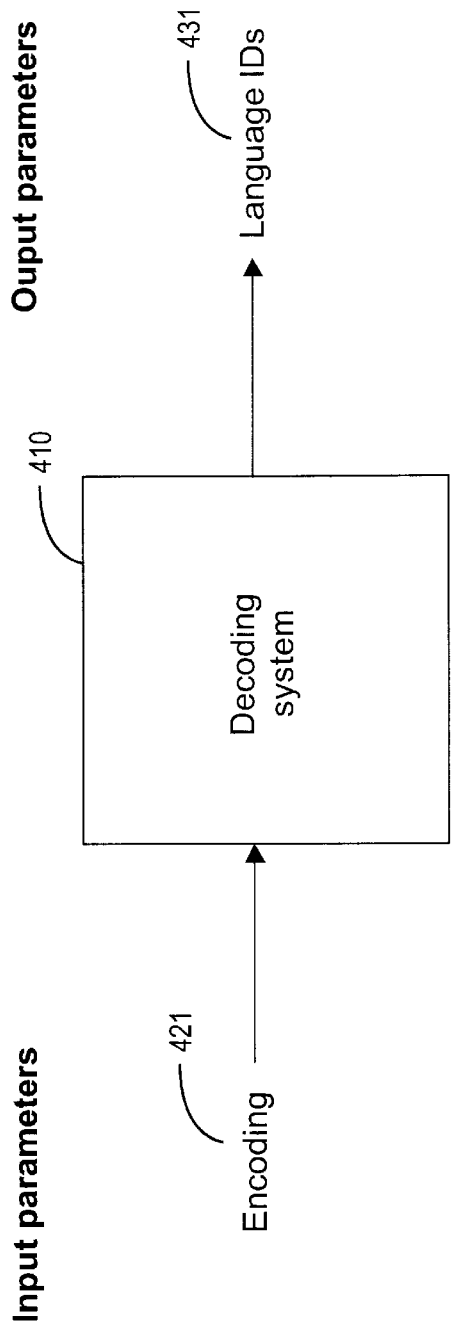
FIG. 4 is a high-level block diagram of an address-language decoding system of the present invention.

Processing of address language information may occur in a corresponding manner. FIG. 4 illustrates a high-level block diagram of address-language decoding system 400 of the present invention for processing address-language information—that is, information describing the particular language or languages that are valid for a given address under examination. As shown, the system includes an address-language decoding system (proper) 410. As input, the system 410 takes an address-language encoding input 421, which is provided from an address-language encoding database. As output, the system 410 produces language IDs (ISO-defined) output 431. Here, the system 410 takes the address-language encoding (in a compact representation stored in a database), such as Belgium is supported by Flemish, French, and German language addresses, and converts that into corresponding ISO-defined language IDs or identifiers.

2. Encoding Grammar

The context-free grammar used for encoding address languages is a regular expression specified as follows:

langid binary integer computed from a 3-character language code address languages langid COLON (langid COLON)* SEMIC COLON and SEMIC are distinct non-printable characters encoded according to the Unicode Standard, Version 3 or later.

The meaning of the encoding is as follows. One first computes a language ID, or langid, using a 3-character language code that includes those from the terminological section of the ISO 639-2:1998 standard, supplemented with others not defined in the standard (e.g., Farsi). See, e.g., International Organization for Standardization, ISO 639-2:1998 *Codes for the representation of names of languages—Part 2: Alpha-3 code,* Organization for Standardization, 1998, the disclosure of which is hereby incorporated by reference. Treating the ASCII value of each character as an integer and representing them, in left-to-right order, as code[1], code[2], and code[3], respectively, one may compute:

langid code[1]×1,000,000+code[2]×1,000+code[3]

The meaning of the encoding is therefore a sequence of one or more of these langid integers separated by COLONs and terminated by a SEMIC.

3. Grammar Examples

The examples below will use the grammar symbols and values from Table 1 above. Although language IDs are binary values in the actual encoding, one may represent them here as a string of numbers for clarity.

Example 1
Encoding:
101110103:;
Meaning:
This contains one language, viz. English, whose language ID is computed from its language code, "eng", as follows:

$$\text{code}[1] \times 1{,}000{,}000 + \text{code}[2] \times 1{,}000 + \text{code}[3] = \text{``}e\text{''} \times 1{,}000{,}000 + \text{``}n\text{''} \times 1{,}000 + \text{``}g\text{''}$$

$$= 101 \times 1{,}000{,}000 + 110 \times 1{,}000 + 103$$

Example 2
Encoding:
101110103:115112097:102114097:;
Meaning:
This contains three languages: English, Spanish (115112097 from "spa"), and French (102114097 from "fra").

4. Processing of Language Encoding

The use of finite automata to process strings encoded according to regular expressions is well-known to those versed in the art; see, e.g., Aho et al., above. Finite automata to process these encodings can be implemented in popular programming languages, including C and Java.

5. Use of Language Encodings in Address Normalization

Address normalization can be used to process addresses into a common format that can then be compared with others in a database. Normalizations are often language-dependant and since addresses can be in any language, it is necessary to determine what language an address is in before normalization can take place. Doing so by examining the data within an address would be inefficient since large dictionaries of words for all languages present in addresses may have to be examined. However since a country's addresses are typically only in a very few languages and only a few of these affect normalizations, they can be encoded and stored in a database together with other country-specific data.

When an address for a country is to be normalized, these languages can then be determined from the language encoding and the appropriate normalizations applied. Since the actual language the address is in is unknown, normalization rules for all languages encoded for the country are applied to the address one after the other to obtain several possible normalized forms. As mentioned before, since the number of languages affecting normalizations for a country is typically very small (mostly less than three), the number of these normalized forms is manageable. The appropriate form to use can then be determined by checking the normalized addresses against a database of valid addresses for the country.

Language encodings can be stored in a database according to the countries they apply to. The pseudocode below serves to illustrate how language encodings can be used for normalization:

```
 1  given input address and country name, c
 2  perform language-independent normalizations first
 3  if 1 is a Latin language
 4      convert all address fields to upper case
 5  ...
 6  endif
 7  retrieve country-specific data using c including language encoding, 1
 8  for each language in 1
 9      if 1 is English
10          if street name has more than 2 words and starts with
            "St."
11              expand "St." to "Saint"
12          endif
13          if c is USA
14              if street name has two consecutive street types
15                  abbreviate the second
16              else if first word is " N" and not followed by a
                street type
17                  expand "N" to "North"
18              ...
19              endif
20          else if c is UK
21              ...
22          endif
23      else if 1 is Spanish
24          ...
25      endif
26  endfor
```

The example above shows how language and country information are used to determine the nature of abbreviation expansion/creation for addresses in English:

1. Before any language-specific normalizations are performed, those independent of language are first applied, e.g., removal of leading and trailing blanks and tabs (line 2).
2. Next, any generic language normalization is applied, e.g., case conversion of Latin addresses to uppercase (lines 3 to 6).
3. Country-specific data including the language encoding are then retrieved from a database using the country name (line 7).
4. A loop will then decode each language in the encoding and perform language- and country-specific normalizations (lines 8 to 26).
5. The rules are first divided by language and then by country.
6. For English, all abbreviations of "Saint" in street addresses are first expanded. (lines 10 to 12).
7. Then for English addresses used in the U.S., U.S.-specific abbreviation processing rules are applied (lines 13 to 19).
8. Addresses from other countries and languages are similarly processed (lines 20 to 25).

The finite automata code to process language encodings and the pseudocode above can be implemented as programs operating outside the database, retrieving encodings as, and when, they are needed from the database. With the advent of databases supporting Java classes (and perhaps other languages in the future), finite automata and pseudocode implementations in Java (and other languages) can also be included in the same database as the language encodings.

D. Encoding system for address data

1. Overview

Figure 5:
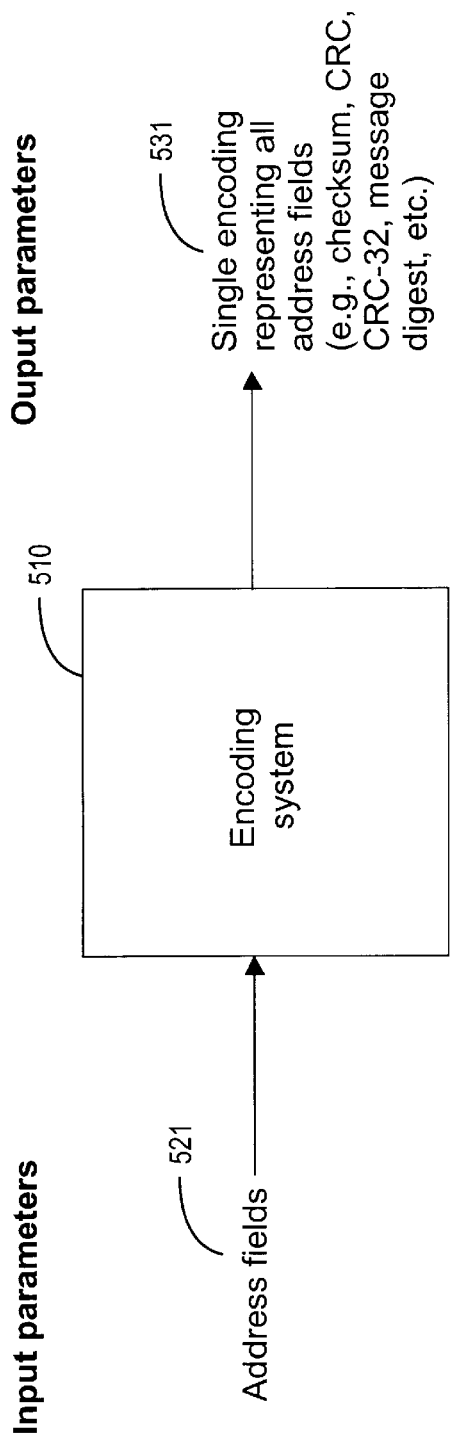
FIG. 5 is a high-level block diagram of an encoding system for address data of the present invention.

FIG. 5 represents an encoding system 500 for address data. As shown, an encoding system (proper) or engine 510 takes as an input parameter a set of address fields 521 (i.e., actual original address information that comprises a given postal address), and supplies as an output parameter a single encoding 531 representing all of the address fields that are unique with a high degree of probability. The encoding system 510 is able to accept address fields 521 in many character sets for generating hash values. The encoding system 500 functions as a hash value generator, for generating a unique hash value for a particular set of address fields. For this purpose, a conventional hash generator may be employed, including checksum, CRC-32, message digest (e.g., MD-4 or MD-5), Secure Hash Algorithm (SHA), or even a good hash function (having uniqueness with high probability). In the currently-preferred embodiment, the ANSI CRC-32 algorithm is employed, yielding approximately four billion unique hash values.

A second order of resolution is available. The actual address information is itself stored in the system, in addition to the hash value, so that the system can support updatable addresses as well as address browsing. If desired, the system may be designed to accommodate a recipient name as one of the address fields, such that it is stored and processed in a manner similar to other address fields. Thus, the actual address information corresponding to an address hash value may be retrieved if needed (e.g., to resolve hash collision). However, for first order processing, an address's hash value is used instead as an index into a table of address information, as that provides the most efficient processing (e.g., for table joins). The table of address information itself includes pointers to other tables, for instance, a pointer (e.g., 32-bit integer) to a table of province names, instead of storing text string information for addresses. In the highly unlikely event that a hash collision occurs, the pointer information may be dereferenced for accessing the particular text string information that comprises a given address. Pointer information may also be dereferenced if there is insufficient confidence that the address signature generation method is able to produce unique values for all addresses.

2. Use of Address Data Encoding

The following example illustrates the use of an address data encoding system in a database table having the following columns:

| | |
|---|---|
| countryid | smallint |
| addrsig | int |
| provinceid | int |
| cityid | int |
| streetaddrid | int |

Figure 6:
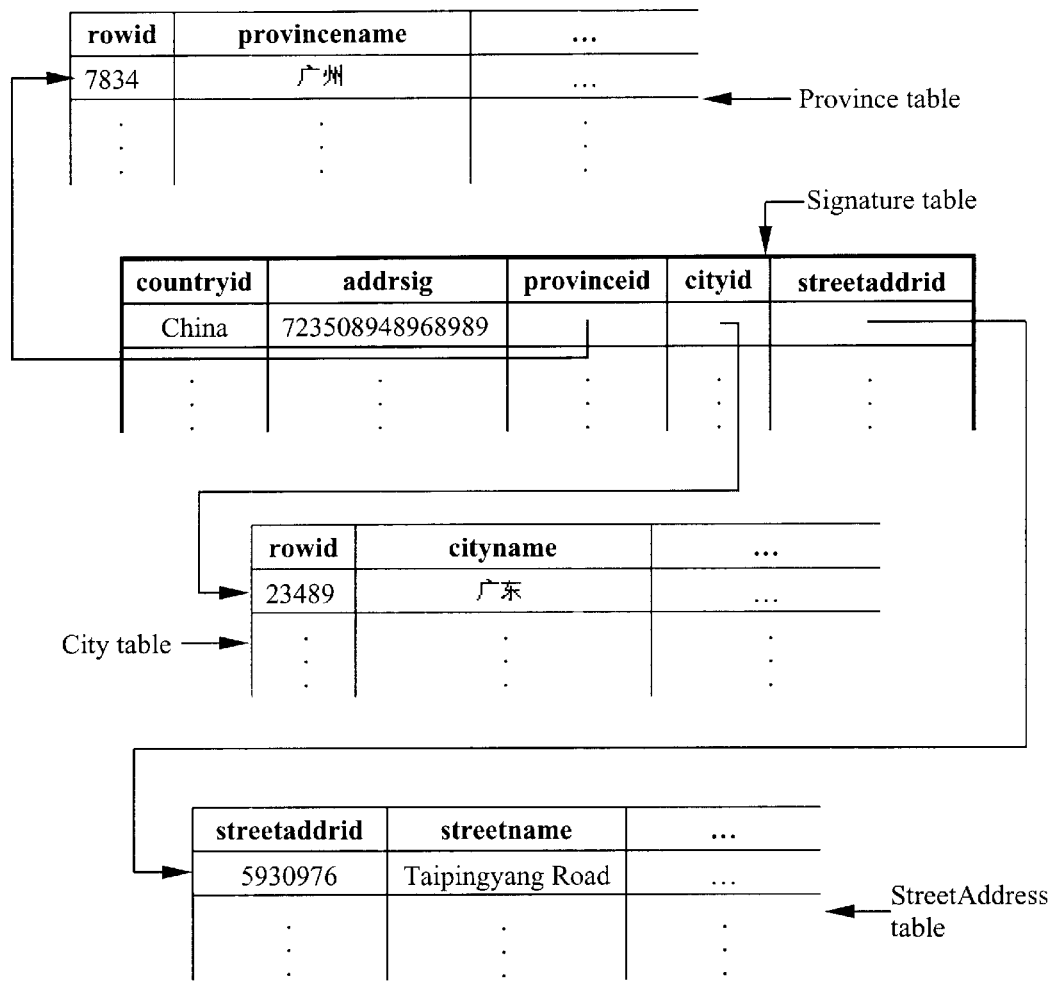
FIG. 6 is a diagram illustrating the relationship between signature and other database tables in accordance with the present invention.

FIG. 6 illustrates the particular relationship between signature and other database tables.

In the example above, address signatures are stored in the Signature table and computed using data from 3 tables, viz. the Province, City, and StreetAddress tables. In particular, data from the provincename, cityname, and streetname columns are combined to compute signatures. Other and different data can also be combined and used provided the combinations provide enough variation to allow more or less unique signatures to be generated for each combination. Note that the language of the data used is unimportant as illustrated by the contents of the provincename, cityname, and streetname columns. Note also that the Province, City, and StreetAddress tables each have a row identifier column (e.g., rowid, streetaddrid, or the like) that serves as the primary key for those tables. To cater to situations in which multiple addresses share the same signature, the row identifiers (rowids) of those rows used to compute each signature in the Signature table are kept with the signatures themselves. Once a signature is matched, the data used to compute it can be quickly and precisely accessed to resolve any ambiguities.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for assisting with validation of international postal address information, the method comprising:
    establishing an address languages encoding on a per country basis, for specifying which written languages may be employed for a given postal address;
    establishing a required address fields encoding on a per country basis, for specifying address fields that are required to be present for a given postal address to be valid;
    receiving input comprising a particular postal address to be validated; and
    in response to said input, performing substeps of:
        (a) based on said address languages encoding, determining which written language the particular postal address employs, and
        (b) based on said required address fields encoding and said determined written language, determining whether the particular postal address includes all required address fields.

2. The method of claim 1, further comprising:
    establishing an address data encoding allowing computation of a signature for a given postal address; and
    storing the signature of the particular postal address to a database for future reference.

3. The method of claim 2, further comprising:
    after determining that the particular postal address includes all required address fields, attempting to validate the particular postal address by comparing it against a database of known postal addresses.

4. The method of claim 3, wherein each known postal address is represented in the database by a signature value, and wherein said step of attempting to validate comprises computing a signature for the particular postal address into comparing it against corresponding signatures stored in the database for known postal addresses.

5. The method of claim 4, wherein the signature value for a given postal address is computed as a hash value based on address data present in that given postal address.

6. The method of claim 5, wherein said hash value comprises a selected one of a checksum or message digest value.

7. The method of claim 1, wherein each particular address language encoding is associated with at least one character set for a given written language.

8. The method of claim 1, wherein at least some countries have more than one written language that may be employed for valid postal addresses.

9. The method of claim 1, wherein said required address fields encoding includes information specifying country-specific format requirements that a given country may require for a valid postal address.

10. The method of claim 1, further comprising:
    generating an error code indicating that the particular postal address does not include all required address fields.

11. The method of claim 1, further comprising:
    generating an error code indicating that the particular postal address does not employ a written language that is valid.

12. The method of claim 1, wherein a plurality of required address fields encodings are stored, one for each country whose postal addresses are to be validated.

13. The method of claim 1, wherein said step of determining whether the particular postal address includes all required address fields includes:
    determining a destination country that a given postal address specifies;
    retrieving a required address fields encoding based on the determined destination country; and
    comparing address fields present in the given postal address against those specified as required in the retrieved required address fields encoding.

14. The method of claim 13, further comprising:
    if a required address field is not found in the given postal address, indicating an error in the given postal address.

15. The method of claim 14, wherein said error includes information indicating which specific required address field is not found in the given postal address.

16. The method of claim 1, wherein said address languages encoding specifies which particular languages are appropriate to use in a postal address for a given country.

17. The method of claim 1, further comprising:
    decoding said address languages encoding to produce one or more language identifiers indicating which particular languages are appropriate to use in a postal address for a given country.

18. The method of claim 1, further comprising:
    identifying any abbreviations present in a given postal address; and
    expanding out all abbreviations so identified.

19. The method of claim 1, wherein multiple address languages encodings are stored in a database, each particular address languages encoding being stored according to one or more countries that that particular address languages encoding applies to.

20. The method of claim 1, further comprising:
for address fields determined to be present in a given postal address, validating those address fields by comparison with a database of known postal addresses.

21. A system providing validation of international postal address information comprising:
an address languages encoding module storing address languages encodings on a per country basis, for specifying which written languages may be employed for a given postal address;
a required address fields encoding module storing required address fields encodings on a per country basis, for specifying address fields that are required to be present for a given postal address to be valid;
an input module for receiving a particular postal address to be validated; and
a validation module, responsive to said address languages encodings and said required address fields encodings, for determining validity of the particular postal address.

22. The system of claim 21, wherein said system identifies any required address field missing from the particular postal address.

23. The system of claim 21, wherein said system validates information stored in the address fields that are present in the particular postal address against a database of known addresses.

24. The system of claim 23, wherein validation of information stored in the address fields that are present in the particular postal address occurs through comparison of computed signature values.

25. The system of claim 24, wherein said computed signature values comprise hash values.

* * * * *